(12) United States Patent
Yamamoto

(10) Patent No.: US 10,222,545 B2
(45) Date of Patent: Mar. 5, 2019

(54) OPTICAL FIBER

(71) Applicant: SUMITOMO ELECTRIC INDUSTRIES, LTD., Osaka-shi, Osaka (JP)

(72) Inventor: Yoshinori Yamamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/973,851

(22) Filed: May 8, 2018

(65) Prior Publication Data

US 2018/0329137 A1    Nov. 15, 2018

(30) Foreign Application Priority Data

May 11, 2017 (JP) ................. 2017-094735

(51) Int. Cl.
*G02B 6/02* (2006.01)
*G02B 6/036* (2006.01)
*G02B 6/028* (2006.01)

(52) U.S. Cl.
CPC ....... *G02B 6/02014* (2013.01); *G02B 6/0281* (2013.01); *G02B 6/03627* (2013.01)

(58) Field of Classification Search
None
See application file for complete search history.

(56) References Cited

U.S. PATENT DOCUMENTS 7,876,990 B1    1/2011    Mishra

*Primary Examiner* — Jerry Rahll
(74) *Attorney, Agent, or Firm* — Drinker Biddle & Reath LLP

(57) ABSTRACT

An optical fiber includes a core having a maximum refractive index $n_1$, and cladding provided around the core and having a refractive index $n_0$ that is lower than the maximum refractive index $n_1$. A radial refractive-index profile of the core is expressed with an exponent $\alpha$ that is 1.5 to 10. A relative refractive-index difference $\Delta_1$ at a center of the core that is expressed as $\Delta_1 = 100 \times (n_1^2 - n_0^2)/(2n_1^2)$ is 0.3% to 0.5%. A diameter $2a$ of the core is 9 μm to 14 μm. A zero-dispersion wavelength is 1300 nm to 1324 nm. A cable cutoff wavelength $\lambda cc$ is 1260 nm or shorter. A bending loss at a wavelength of 1550 nm in a case where the optical fiber is wound by ten turns with a bend diameter of 30 mm is 0.25 dB or smaller.

6 Claims, 17 Drawing Sheets

FIG. 15

| FACTOR | UNIT | WAVE LENGTH [nm] | FIBER 1 | FIBER 2 | FIBER 3 | FIBER 4 | FIBER 5 | FIBER 6 | FIBER 7 | FIBER 8 |
|---|---|---|---|---|---|---|---|---|---|---|
| EXPONENT $\alpha$ | - | - | 1.5 | 2.0 | 2.0 | 2.5 | 2.5 | 2.5 | 2.8 | 3.0 |
| $\Delta 1$ | [%] | - | 0.445 | 0.420 | 0.460 | 0.415 | 0.440 | 0.466 | 0.487 | 0.390 |
| $\Delta 2$ | [%] | - | -0.05 | -0.04 | -0.07 | 0 | 0 | -0.06 | -0.02 | -0.04 |
| 2a | [μm] | - | 13.35 | 12.44 | 12.14 | 12.00 | 10.84 | 11.65 | 10.61 | 11.52 |
| 2b | [μm] | - | 40.05 | 38.56 | 41.28 | - | - | 41.94 | 42.44 | 42.62 |
| b/a | - | - | 3.0 | 3.1 | 3.4 | - | - | 3.6 | 4.0 | 3.7 |
| ZERO-DISPERSION WAVELENGTH | [nm] | - | 1315 | 1312 | 1308 | 1313 | 1324 | 1307 | 1317 | 1307 |
| MFD | [μm] | 1310 | 9.19 | 9.12 | 8.73 | 9.19 | 8.71 | 8.61 | 8.30 | 9.10 |
| Aeff | [μm²] | 1310 | 64.5 | 64.1 | 59.2 | 65.2 | 58.1 | 57.8 | 53.5 | 64.6 |
| MFD | [μm] | 1550 | 10.29 | 10.20 | 9.68 | 10.31 | 9.85 | 9.53 | 9.28 | 10.13 |
| Aeff | [μm²] | 1550 | 80.1 | 79.0 | 71.9 | 80.6 | 73.1 | 69.9 | 65.7 | 78.7 |
| $\lambda c$ | [nm] | - | 1263 | 1256 | 1293 | 1322 | 1240 | 1318 | 1301 | 1243 |
| $\lambda cc$ | [nm] | - | 1188 | 1185 | 1232 | 1232 | 1168 | 1258 | 1239 | 1179 |
| $\lambda c - \lambda cc$ | [nm] | - | 75 | 71 | 61 | 90 | 73 | 60 | 62 | 65 |
| MAC | - | - | 7.28 | 7.26 | 6.75 | 6.95 | 7.02 | 6.53 | 6.38 | 7.32 |
| BENDING LOSS WITH 30-mm DIAMETER | [dB/10 TURNS] | 1550 | 0.048 | 0.048 | 0.003 | 0.015 | 0.026 | 0.001 | 0.000 | 0.064 |

FIG. 16

| FACTOR | UNIT | WAVE LENGTH [nm] | FIBER 9 | FIBER 10 | FIBER 11 | FIBER 12 | FIBER 13 | FIBER 14 | FIBER 15 |
|---|---|---|---|---|---|---|---|---|---|
| EXPONENT α | – | – | 3.0 | 3.3 | 4.0 | 5.0 | 10 | 10 | 10 |
| Δ1 | [%] | – | 0.406 | 0.405 | 0.428 | 0.359 | 0.358 | 0.337 | 0.346 |
| Δ2 | [%] | – | -0.08 | -0.04 | -0.07 | -0.03 | 0 | 0 | -0.02 |
| 2a | [μm] | – | 11.72 | 11.44 | 10.72 | 10.8 | 9.74 | 9.88 | 10.33 |
| 2b | [μm] | – | 30.47 | 35.46 | 40.74 | 43.2 | – | – | 40.29 |
| b/a | – | – | 2.6 | 3.1 | 3.8 | 4.0 | – | – | 3.9 |
| ZERO-DISPERSION WAVELENGTH | [nm] | – | 1300 | 1304 | 1300 | 1303 | 1308 | 1309 | 1300 |
| MFD | [μm] | 1310 | 8.94 | 9.00 | 8.58 | 9.23 | 9.20 | 9.42 | 9.39 |
| Aeff | [μm²] | 1310 | 63.1 | 63.7 | 58.6 | 67.5 | 67.3 | 70.4 | 71.0 |
| MFD | [μm] | 1550 | 9.85 | 9.98 | 9.46 | 10.27 | 10.31 | 10.58 | 10.41 |
| Aeff | [μm²] | 1550 | 75.4 | 76.8 | 69.7 | 81.5 | 82.0 | 86.2 | 84.8 |
| λc | [nm] | – | 1269 | 1290 | 1280 | 1241 | 1261 | 1236 | 1280 |
| λcc | [nm] | – | 1211 | 1224 | 1229 | 1176 | 1187 | 1161 | 1209 |
| λc−λcc | [nm] | – | 58 | 66 | 51 | 65 | 74 | 76 | 70 |
| MAC | – | – | 7.05 | 6.98 | 6.70 | 7.44 | 7.30 | 7.62 | 7.34 |
| BENDING LOSS WITH 30-mm DIAMETER | [dB/10 TURNS] | 1550 | 0.016 | 0.012 | 0.003 | 0.124 | 0.093 | 0.317 | 0.085 |

FIG. 17

| FACTOR | UNIT | FIBER 16 | FIBER 17 | FIBER 18 | FIBER 19 | FIBER 20 | FIBER 21 | FIBER 22 | FIBER 23 | FIBER 24 |
|---|---|---|---|---|---|---|---|---|---|---|
| $\lambda_0$ | [nm] | 1310 | 1308 | 1308 | 1311 | 1306 | 1309 | 1320 | 1314 | 1317 |
| MFD @1310 nm | [μm] | 9.01 | 9.11 | 9.18 | 9.03 | 9.27 | 8.96 | 8.61 | 8.78 | 8.64 |
| $\lambda c$ | [nm] | 1282 | 1317 | 1301 | 1250 | 1332 | 1306 | 1179 | 1242 | 1227 |
| $\lambda cc$ | [nm] | 1211 | 1242 | 1226 | 1181 | 1252 | 1234 | 1124 | 1179 | 1167 |
| $\lambda c - \lambda cc$ | [nm] | 71 | 76 | 75 | 68 | 80 | 72 | 55 | 63 | 60 |
| MAC | | 7.03 | 6.92 | 7.05 | 7.22 | 6.96 | 6.86 | 7.31 | 7.07 | 7.04 |
| BENDING LOSS 30-mm DIAMETER @ 1550 nm | [dB/10 turn] | 0.016 | 0.009 | 0.018 | 0.044 | 0.010 | 0.007 | 0.084 | 0.024 | 0.022 |
| DIAMETER OF CLADDING | [μm] | 124.8 | 124.3 | 125.6 | 125.1 | 125.0 | 124.8 | 125.4 | 125.5 | 124.5 |
| OD OF 1st RESIN LAYER | [μm] | 199 | 186 | 190 | 193 | 173 | 162 | 152 | 170 | 160 |
| OD OF 2nd RESIN LAYER | [μm] | 250 | 248 | 245 | 240 | 209 | 201 | 200 | 193 | 192 |

OPTICAL FIBER

BACKGROUND OF THE INVENTION

Field of the Invention

The present invention relates to an optical fiber.

Description of the Related Art

A single-mode optical fiber (SMF) defined by Telecommunication Standardization Sector of International Telecommunication Union (ITU-T) in Recommendation G.652, an international standard, is used worldwide as the most general optical fiber for optical communication systems. According to Recommendation G.652, the mode field diameter (MFD) of the SMF at a wavelength of 1310 nm shall be 8.6 µm to 9.2 µm in nominal value (with a tolerance of ±0.4 µm). If the MFD falls within this range, the MFD mismatching between SMFs to be fusion-spliced with each other at the respective end facets thereof can be made small, whereby the fusion-splicing loss can be made small. Recommendation G.652 also defines that the SMF shall have a cable cutoff wavelength $\lambda cc$ of 1260 nm or shorter. If $\lambda cc$ falls within this range, the single-mode behavior of signal light at a wavelength of about 1310 nm or longer can be guaranteed.

On the other hand, if an optical fiber is laid while being bent with a small bend diameter or if a number of optical fibers are densely provided in one cable, the bending loss of such an optical fiber is desired to be small. It is known that the bending loss of the optical fiber can be reduced by reducing the macrobending number (MAC) of the optical fiber. Here, MAC value is obtained by dividing the MFD [µm] at a wavelength of 1310 nm by fiber cutoff wavelength $\lambda c$ [µm]. That is, in order to reduce the bending loss of the optical fiber, it is effective to reduce the MFD and/or to increase the fiber cutoff wavelength $\lambda c$. However, an optical fiber having a reduced MFD exhibits increased MFD mismatching with respect to the general SMF. Such mismatching increases the fusion-splicing loss. Moreover, an optical fiber having increased $\lambda c$ can no longer be guaranteed in terms of the single-mode behavior of signal light.

A SMF according to a related-art invention disclosed by U.S. Pat. No. 7,876,990 includes a core having a radial refractive-index profile that is expressed with an exponent α, which is greater than 2.5 and less than 3.0. According to U.S. Pat. No. 7,876,990, setting the exponent α as above reduces transmission loss. However, the description in U.S. Pat. No. 7,876,990 takes no consideration for the reduction of bending loss. In addition, the SMF disclosed by U.S. Pat. No. 7,876,990 does not have a refractive index profile including a depressed portion.

SUMMARY OF THE INVENTION

The present invention provides an optical fiber having a MAC value that is equal to the MAC value of a general SMF that conforms to ITU-T Recommendation G.652, with a small bending loss.

According to an aspect of the present invention, there is provided an optical fiber including a core having a maximum refractive index $n_1$, and cladding provided around the core and having a refractive index $n_o$ that is lower than the maximum refractive index $n_1$. A radial refractive-index profile of the core is expressed with an exponent α that is 1.5 to 10. A relative refractive-index difference $\Delta_1$ at a center of the core that is expressed as $\Delta_1=100\times(n_1^2-n_o^2)/(2n_1^2)$ is 0.3% to 0.5%. A diameter $2a$ of the core is 9 µm to 14 µm. A zero-dispersion wavelength is 1300 nm to 1324 nm. A cable cutoff wavelength $\lambda cc$ is 1260 nm or shorter. A bending loss at a wavelength of 1550 nm in a case where the optical fiber is wound by ten turns with a bend diameter of 30 mm is 0.25 dB or smaller.

It is preferable that the above optical fiber further include a depressed portion provided around the core and between the core and the cladding and having a refractive index $n_2$ that is lower than both the maximum refractive index $n_1$ and the refractive index $n_o$. It is also preferable that a relative refractive-index difference $\Delta_2$ of the depressed portion that is expressed as $\Delta_2=100\times(n_2^2-n_o^2)/(2n_2^2)$ be −0.1% to 0%. It is also preferable that a ratio (b/a) of an outside diameter $2b$ of the depressed portion to the diameter $2a$ of the core be 2.4 to 4.0.

It is also preferable that the exponent α be 2.0 to 5.0. It is also preferable that the bending loss of the optical fiber at the wavelength of 1550 nm in the case where the optical fiber is wound by ten turns with the bend diameter of 30 mm be 0.03 dB or smaller (equivalent to that defined by ITU-T G.657.A2). It is also preferable that a difference ($\lambda c-\lambda cc$) between a fiber cutoff wavelength $\lambda c$ and the cable cutoff wavelength $\lambda cc$ be 50 nm to 100 nm.

It is also preferable that the above optical fiber further include a first resin layer provided around the cladding and made of ultraviolet-curable resin and a second resin layer provided around the first resin layer and made of ultraviolet-curable resin. It is also preferable that the cladding have an outside diameter of 124.3 µm to 125.7 µm, and the second resin layer have an outside diameter of 188 µm to 210 µm.

The optical fiber according to the above aspect of the present invention has a MAC value that is equal to the MAC value of a general SMF that conforms to ITU-T Recommendation G.652, with small bending loss.

BRIEF DESCRIPTION OF THE DRAWINGS

FIG. 15 is a table summarizing relevant factors of Fibers 1 to 8 according to specific examples.

FIG. 16 is a table summarizing relevant factors of Fibers 9 to 15 according to other specific examples.

FIG. 17 is a table summarizing relevant factors of Fibers 16 to 24 according to other specific examples.

DESCRIPTION OF THE PREFERRED EMBODIMENTS

Figure 1:
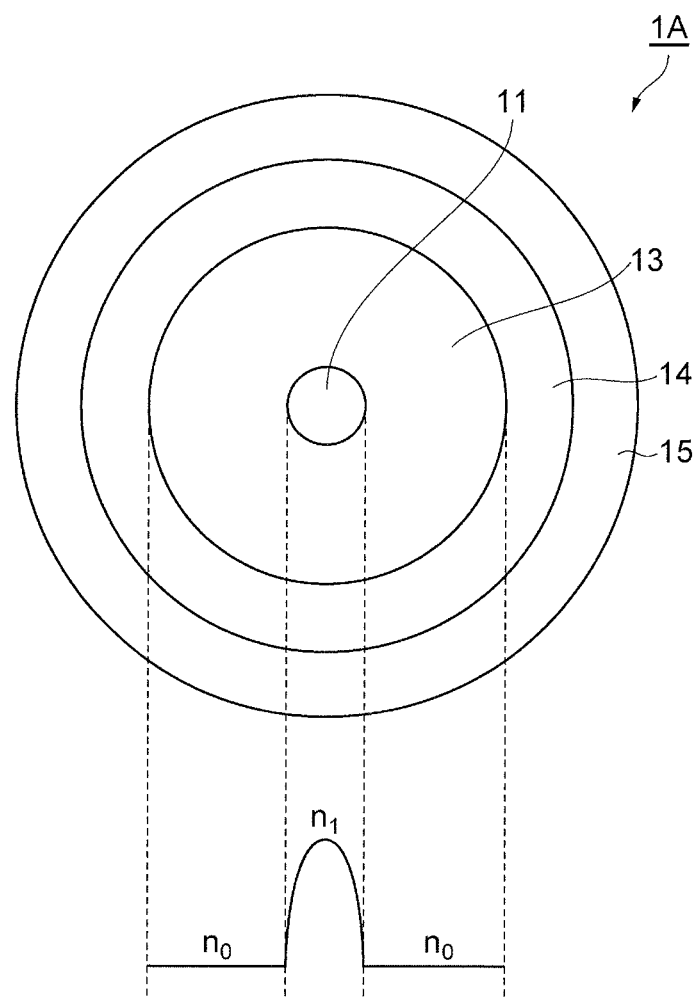
FIG. 1 is a conceptual diagram illustrating a cross section and the radial refractive-index profile of an optical fiber according to a first embodiment.

Embodiments of the present invention will now be described in detail with reference to the accompanying drawings. In the following description and the drawings, the same elements are denoted by the identical reference numeral, and redundant description of the like elements is omitted. The present invention is not limited to the following exemplary embodiments, and the scope thereof is defined by the appended claims, including any equivalents thereto and any changes made thereto within the scope.

First Embodiment

FIG. 1 is a conceptual diagram illustrating a cross section and the radial refractive-index profile of an optical fiber 1A according to a first embodiment. The optical fiber 1A includes a core 11 and cladding 13 provided around the core 11. The core 11 has a maximum refractive index $n_1$. The cladding 13 has a refractive index $n_0$ that is lower than $n_1$. The core 11 is made of silica glass containing GeO$_2$, and the cladding 13 is made of pure silica glass, for example.

A radial refractive-index profile n(r) of the optical fiber 1A is approximated with an exponent $\alpha$ as Expression (1):

$$n(r) = \begin{cases} n_1\left[1 - 2\Delta_1\left(\frac{r}{a}\right)^{\alpha}\right]^{\frac{1}{2}} & (0 \leq r \leq a) \\ n_0 & (r \geq a) \end{cases} \quad (1)$$

where r denotes the radial distance from the center of the core 11, a denotes the radius of the core 11, at which the refractive index n(r) becomes equal to the refractive index $n_0$ of the cladding 13, and $\Delta_1$ denotes the relative refractive-index difference between the center of the core 11 where the refractive index is largest and the cladding 13. The relative refractive-index difference $\Delta_1$ is expressed as Expression (2) below:

$$\Delta_1[\%] = \frac{n_1^2 n_0^2}{2n_1^2} \times 100 \quad (2)$$

The optical fiber 1A further includes a first resin layer 14 provided around the cladding 13, and a second resin layer 15 provided around the first resin layer 14. The first resin layer 14 and the second resin layer 15 are made of ultraviolet-curable resin. The first resin layer 14 has a Young's modulus that is lower than that of the second resin layer 15.

Figure 2:
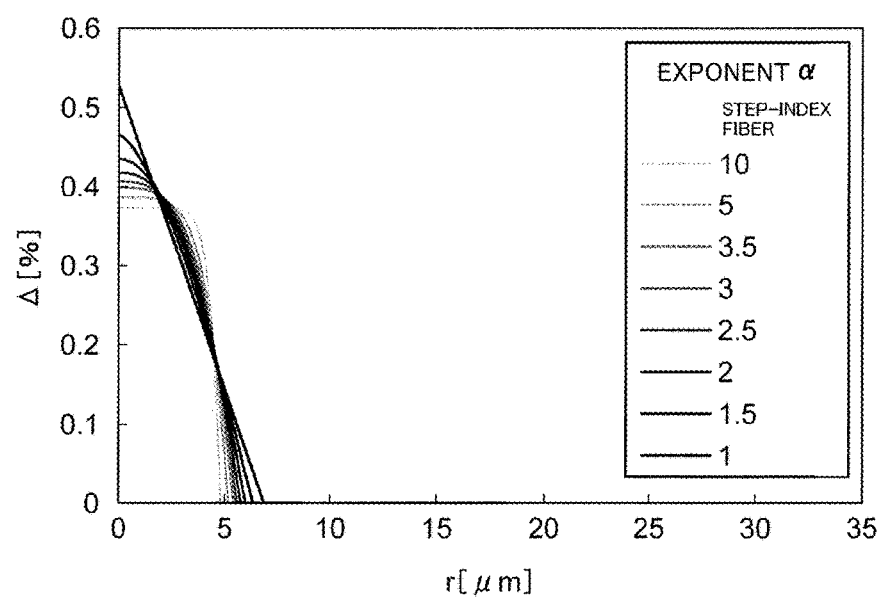
FIG. 2 is a graph illustrating several exemplary refractive-index profiles n(r) of the optical fiber according to the first embodiment, with an exponent α in a function expressing the refractive-index profile being taken as a parameter.

FIG. 2 is a graph illustrating several exemplary refractive-index profiles n(r) of the optical fiber 1A according to the first embodiment, with the exponent $\alpha$ in the function expressing the refractive-index profile being taken as a parameter. The horizontal axis of the graph represents the radial distance r from the center of the core 11. The vertical axis of the graph represents the relative refractive-index difference $\Delta$ with reference to the refractive index $n_0$ of the cladding 13. Provided that the cladding 13 is made of pure silica glass, $\Delta_1$ and the radius a of the core are adjusted such that the MFD at a wavelength of 1310 nm becomes 9.0 μm, $\lambda c$ becomes 1280 nm, and the MAC value becomes 7.0. The exponent $\alpha$ is varied within a range of 1 to 10.

Figure 3:
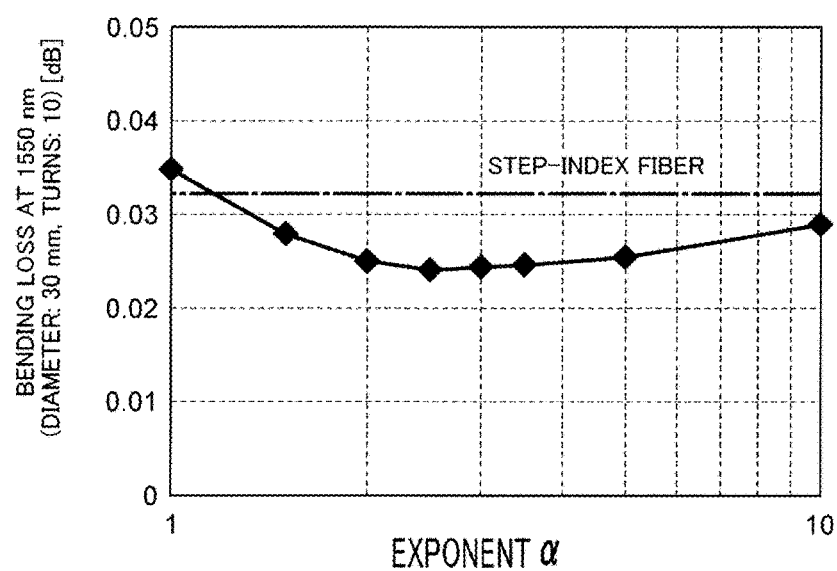
FIG. 3 is a graph illustrating the relationship between the exponent α and the bending loss at a wavelength of 1550 nm in a case where the optical fiber according to the first embodiment is wound by ten turns with a bend diameter of 30 mm.
Figure 4:
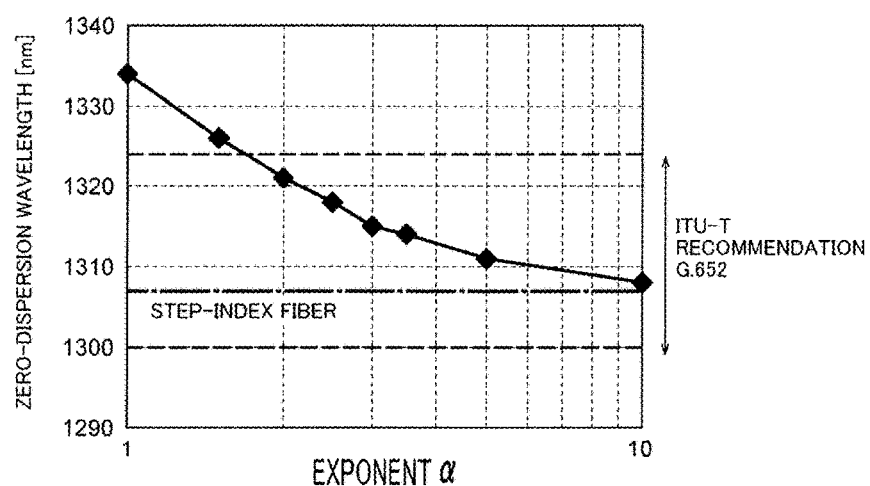
FIG. 4 is a graph illustrating the relationship between the exponent α and the zero-dispersion wavelength of the optical fiber according to the first embodiment.
Figure 5:
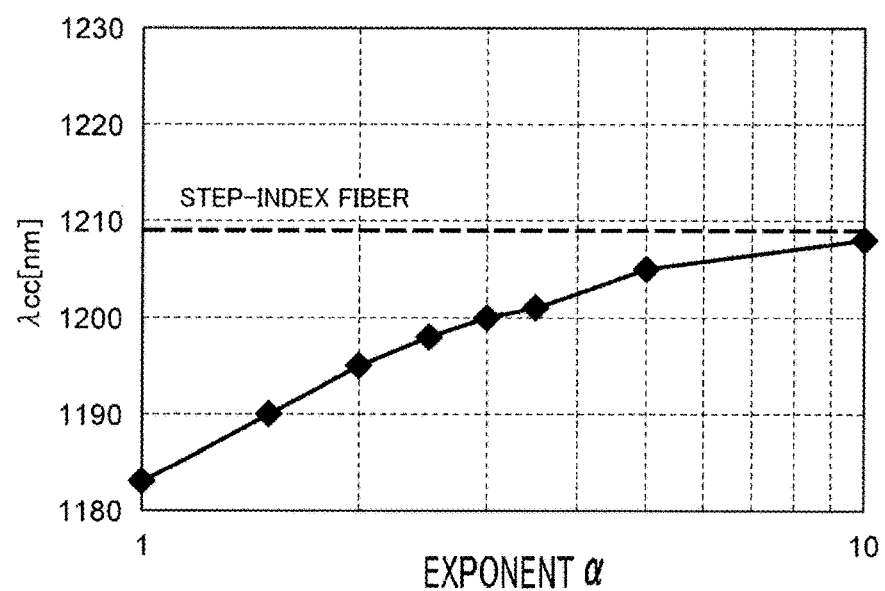
FIG. 5 is a graph illustrating the relationship between the exponent α and the cable cutoff wavelength $\lambda cc$ of the optical fiber according to the first embodiment.

FIGS. 3 to 5 are graphs each illustrating the relationship between the exponent $\alpha$ and a corresponding one of the bending loss, the zero-dispersion wavelength, and the cable cutoff wavelength $\lambda cc$ of the optical fiber 1A according to the first embodiment illustrated in FIG. 1. FIGS. 3 to 5 also illustrate values representing the bending loss, the zero-dispersion wavelength, and the cable cutoff wavelength $\lambda cc$, respectively, in a case of a step-index optical fiber in which the refractive index of the core is constant.

FIG. 3 is a graph illustrating the relationship between the exponent $\alpha$ and the bending loss at a wavelength of 1550 nm in a case where the optical fiber 1A according to the first embodiment is wound by ten turns with a bend diameter of 30 mm. The graph shows that setting the exponent $\alpha$ to a value within a range of 1.5 to 10 makes the bending loss smaller for the same MAC value than in the case of the step-index optical fiber. The graph also shows that setting the exponent $\alpha$ to a value within a range of 2 to 5 makes the bending loss much smaller.

FIG. 4 is a graph illustrating the relationship between the exponent $\alpha$ and the zero-dispersion wavelength of the optical fiber 1A according to the first embodiment. The graph shows that as the exponent $\alpha$ becomes smaller, the zero-dispersion wavelength becomes longer with greater deviation from the range (1300 nm to 1324 nm) recommended by ITU-T G.652. Hence, it is understood that the exponent $\alpha$ is preferably 2 or greater.

FIG. 5 is a graph illustrating the relationship between the exponent $\alpha$ and the cable cutoff wavelength $\lambda cc$ of the optical fiber 1A according to the first embodiment. The graph shows that setting the exponent $\alpha$ to a value within a range of 1.5 to 10 makes the cable cutoff wavelength $\lambda cc$ fall within the range (1260 nm or shorter) recommended by ITU-T G.652.

Second Embodiment

Figure 6:
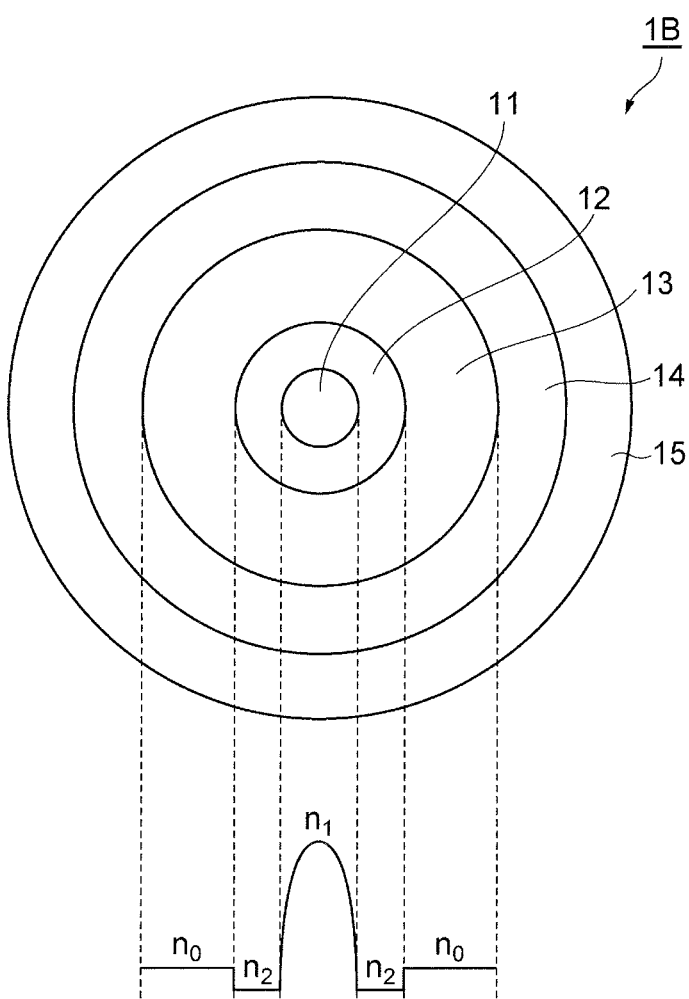
FIG. 6 is a conceptual diagram illustrating a cross section and the radial refractive-index profile of an optical fiber according to a second embodiment.

FIG. 6 is a conceptual diagram illustrating a cross section and the radial refractive-index profile of an optical fiber 1B according to a second embodiment. The optical fiber 1B includes a core 11, a depressed portion 12 provided around the core 11, and cladding 13 provided around the depressed portion 12. The core 11 has a maximum refractive index $n_1$. The cladding 13 has a refractive index $n_0$ that is lower than $n_1$. The depressed portion 12 has a refractive index $n_2$ that is lower than both $n_1$ and $n_0$. The core 11 is made of silica glass containing $GeO_2$, the depressed portion 12 is made of silica glass containing F, and the cladding 13 is made of pure silica glass, for example.

A radial refractive-index profile n(r) of the optical fiber 1B is approximated with an exponent α as Expression (3):

$$n(r) = \begin{cases} n_1 \left[ 1 - 2\Delta_1 \left(\frac{r}{a}\right)^\alpha \right]^{\frac{1}{2}} & (0 \leq r \leq a) \\ n_2 & (a \leq r \leq b) \\ n_0 & (r \geq b) \end{cases} \quad (3)$$

where r denotes the radial distance from the center of the core 11, a denotes the radius of the core 11, at which the refractive index n(r) becomes equal to the refractive index $n_0$ of the cladding 13, b denotes the outside radius of the depressed portion 12, and $\Delta_2$ denotes the relative refractive-index difference of the depressed portion 12 with respect to the cladding 13. The relative refractive-index difference $\Delta_2$ is expressed as Expression (4) below:

$$\Delta_2 [\%] = \frac{n_2^2 n_0^2}{2n_2^2} \times 100 \quad (4)$$

The optical fiber 1B further includes a first resin layer 14 provided around the cladding 13, and a second resin layer 15 provided around the first resin layer 14. The first resin layer 14 and the second resin layer 15 are made of ultraviolet-curable resin. The first resin layer 14 has a Young's modulus that is smaller than that of the second resin layer 15.

Figure 7:
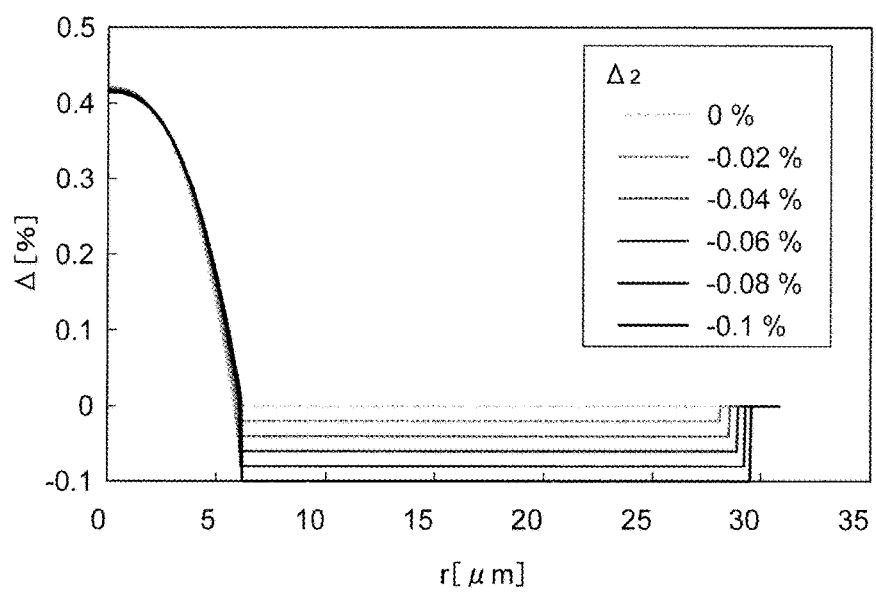
FIG. 7 is a graph illustrating several exemplary refractive-index profiles n(r) of the optical fiber according to the second embodiment, with a relative refractive-index difference $\Delta_2$ of a depressed portion with respect to cladding being taken as a parameter.

FIG. 7 is a graph illustrating several exemplary refractive-index profiles n(r) of the optical fiber 1B according to the second embodiment, with the relative refractive-index difference $\Delta_2$ of the depressed portion 12 with respect to the cladding 13 being taken as a parameter. The horizontal axis of the graph represents the radial distance r from the center of the core 11. The vertical axis of the graph represents the relative refractive-index difference Δ with reference to the refractive index $n_0$ of the cladding 13. Provided that the cladding 13 is made of pure silica glass, $\Delta_1$ and the radius a of the core are adjusted such that the MFD at a wavelength of 1310 nm becomes 9.0 μm, λc becomes 1280 nm, and the MAC value becomes 7.0. The exponent α is set to 2.5. The relative refractive-index difference $\Delta_2$ is varied within a range of −0.1% to 0%.

Figure 8:
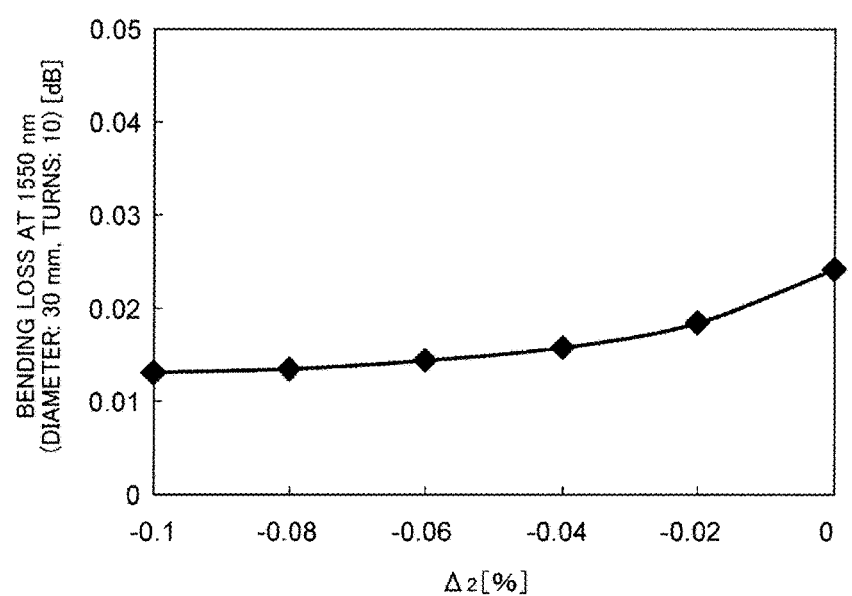
FIG. 8 is a graph illustrating the relationship between the relative refractive-index difference $\Delta_2$ and the bending loss at a wavelength of 1550 nm in a case where the optical fiber according to the second embodiment is wound by ten turns with a bend diameter of 30 mm.

FIG. 8 is a graph illustrating the relationship between the relative refractive-index difference $\Delta_2$ and the bending loss at a wavelength of 1550 nm in a case where the optical fiber 1B according to the second embodiment is wound by ten turns with a bend diameter of 30 mm. The graph shows that the relative refractive-index difference $\Delta_2$ is desired to be negative and the absolute value thereof is desired to be large, because such conditions make the bending loss small.

Figure 9:
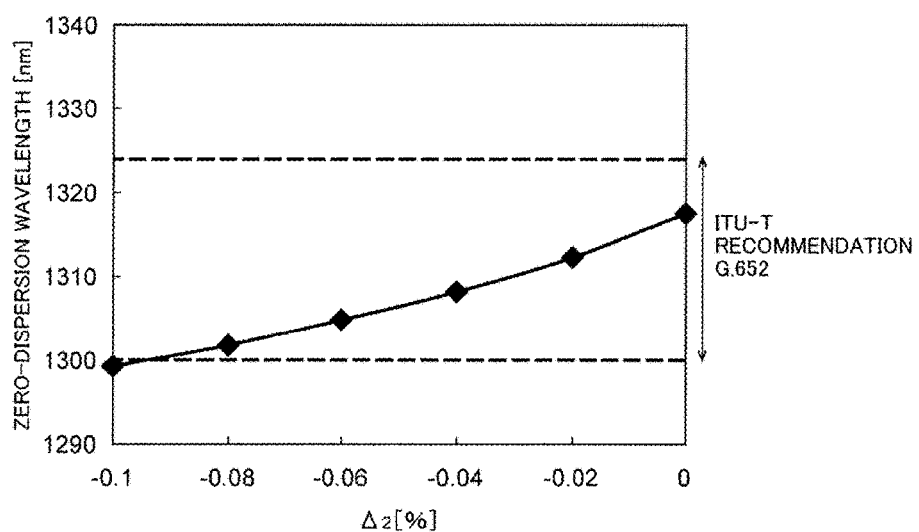
FIG. 9 is a graph illustrating the relationship between the relative refractive-index difference $\Delta_2$ and the zero-dispersion wavelength of the optical fiber according to the second embodiment.

FIG. 9 is a graph illustrating the relationship between the relative refractive-index difference $\Delta_2$ and the zero-dispersion wavelength of the optical fiber 1B according to the second embodiment. The graph shows that as the relative refractive-index difference $\Delta_2$ becomes lower than −0.1% (as the absolute value thereof becomes larger), the zero-dispersion wavelength becomes shorter than the range recommended by ITU-T. Therefore, it is understood that the relative refractive-index difference $\Delta_2$ is desirably −0.1% or greater.

Figure 10:
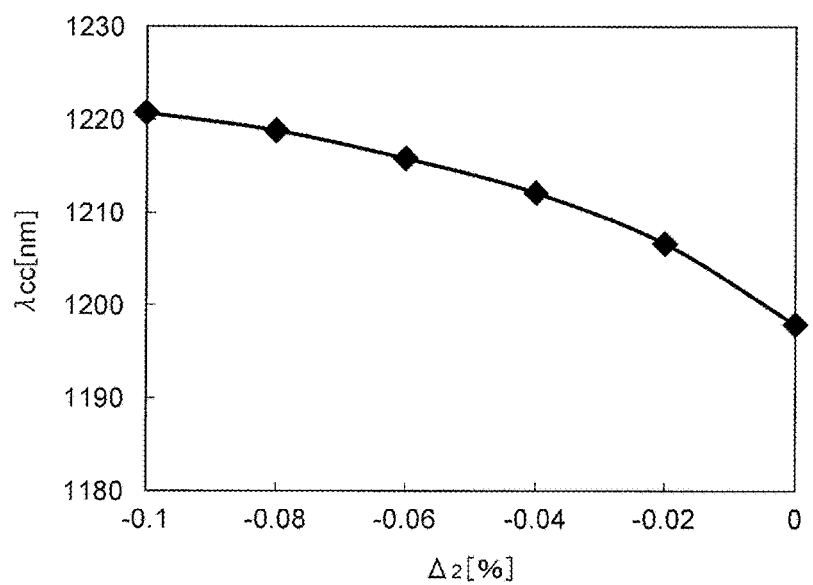
FIG. 10 is a graph illustrating the relationship between the relative refractive-index difference $\Delta_2$ and a cable cutoff wavelength $\lambda cc$ of the optical fiber according to the second embodiment.

FIG. 10 is a graph illustrating the relationship between the relative refractive-index difference $\Delta_2$ and the cable cutoff wavelength λcc of the optical fiber 1B according to the second embodiment. The graph shows that the cable cutoff wavelength λcc falls within the range recommended by ITU-T G.652 if the relative refractive-index difference $\Delta_2$ falls within a range of −0.1 to 0%.

Figure 11:
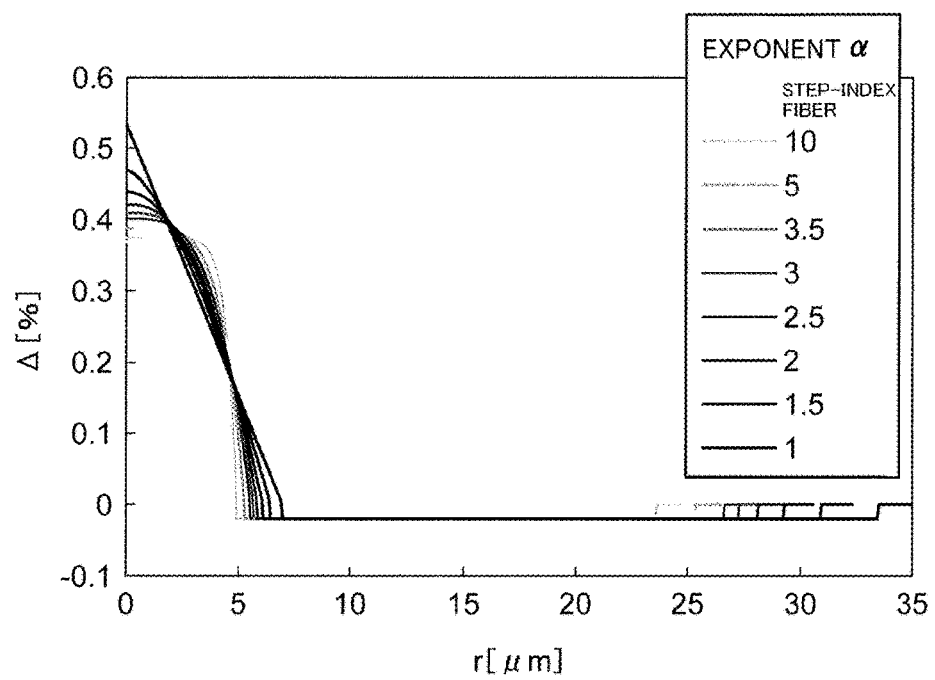
FIG. 11 is a graph illustrating several other exemplary refractive-index profiles n(r) of the optical fiber according to the second embodiment, with the relative refractive-index difference $\Delta_2$ being taken as a parameter.

FIG. 11 is a graph illustrating several other exemplary refractive-index profiles n(r) of the optical fiber 1B according to the second embodiment, with the exponent α in the function expressing the refractive-index profile being taken as a parameter. The horizontal axis of the graph represents the radial distance r from the center of the core 11. The vertical axis of the graph represents the relative refractive-index difference Δ with reference to the refractive index $n_0$ of the cladding 13. Provided that the cladding 13 is made of pure silica glass, $\Delta_1$ and the radius a of the core are adjusted such that the MFD at a wavelength of 1310 nm becomes 9.0 μm, λc becomes 1280 nm, and the MAC value becomes 7.0. The relative refractive-index difference $\Delta_2$ is set to −0.02%. The exponent α is varied within a range of 1 to 10.

Figure 12:
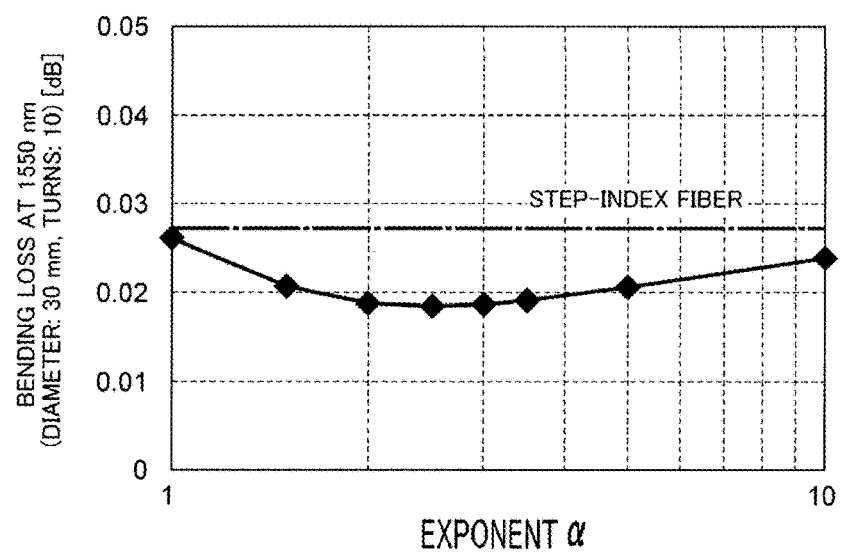
FIG. 12 is a graph illustrating the relationship between the exponent $\alpha$ and the bending loss at a wavelength of 1550 nm in a case where the optical fiber according to the second embodiment is wound by ten turns with a bend diameter of 30 mm.
Figure 13:
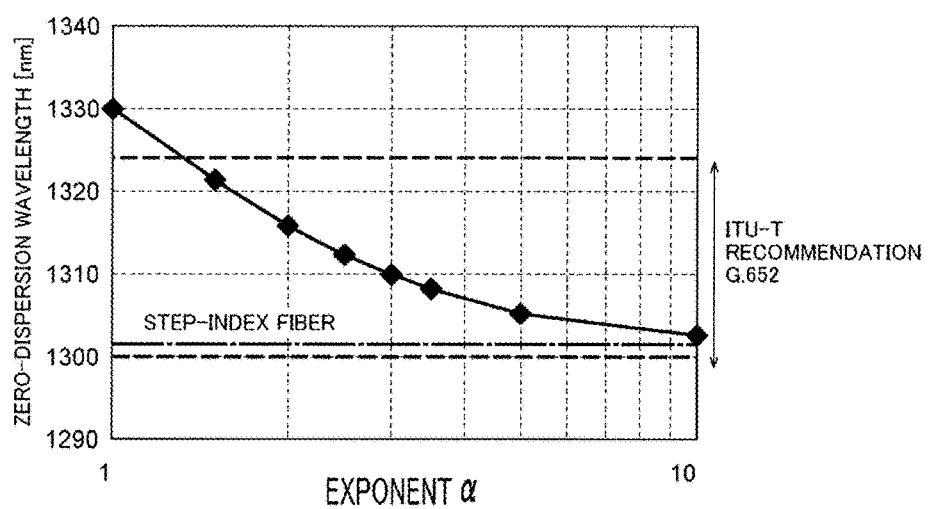
FIG. 13 is a graph illustrating the relationship between the exponent $\alpha$ and the zero-dispersion wavelength of the optical fiber according to the second embodiment.
Figure 14:
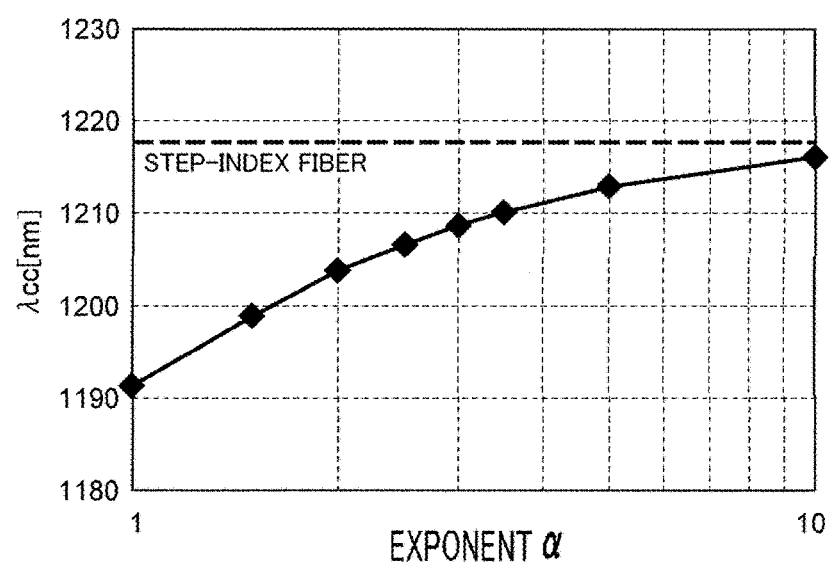
FIG. 14 is a graph illustrating the relationship between the exponent $\alpha$ and the cable cutoff wavelength $\lambda cc$ of the optical fiber according to the second embodiment.

FIGS. 12 to 14 are graphs each illustrating the relationship between the exponent α and a corresponding one of the bending loss, the zero-dispersion wavelength, and the cable cutoff wavelength λcc of the optical fiber 1B according to the second embodiment illustrated in FIG. 6. FIGS. 12 to 14 also illustrate values representing the bending loss, the zero-dispersion wavelength, and the cable cutoff wavelength λcc, respectively, in a case of a step-index optical fiber in which the refractive index of the core is constant.

FIG. 12 is a graph illustrating the relationship between the exponent α and the bending loss at a wavelength of 1550 nm in a case where the optical fiber 1B according to the second embodiment is wound by ten turns with a bend diameter of 30 mm. The graph shows that setting the exponent α to a value within a range of 1.5 to 10 makes the bending loss smaller for the same MAC value than in the case of the step-index optical fiber. The graph also shows that setting the exponent α to a value within a range of 2 to 5 makes the bending loss much smaller.

FIG. 13 is a graph illustrating the relationship between the exponent α and the zero-dispersion wavelength of the optical fiber 1B according to the second embodiment. The graph shows that as the exponent α becomes smaller, the zero-dispersion wavelength becomes longer with greater deviation from the range (1300 nm to 1324 nm) recommended by ITU-T G.652. Hence, it is understood that the exponent α is preferably 2 or greater.

FIG. 14 is a graph illustrating the relationship between the exponent α and the cable cutoff wavelength λcc of the optical fiber 1B according to the second embodiment. The graph shows that setting the exponent a to a value within a range of 1.5 to 10 makes the cable cutoff wavelength λcc fall within the range (1260 nm or shorter) recommended by ITU-T G.652.

EXAMPLES

FIG. 15 is a table summarizing relevant factors of Fibers 1 to 8 according to examples. FIG. 16 is a table summarizing relevant factors of Fibers 9 to 15 according to other examples. The factors summarized in these tables are as follows, in order from the top: the exponent α, the relative refractive-index difference $\Delta_1$ at the center of the core 11, the relative refractive-index difference $\Delta_2$ of the depressed portion 12, a core diameter $2a$, an outside diameter $2b$ of the depressed portion 12, the ratio (b/a), the zero-dispersion wavelength, the MFD at a wavelength of 1310 nm, an effective cross-sectional area Aeff at a wavelength of 1310 nm, the MFD at a wavelength of 1550 nm, an effective cross-sectional area Aeff at a wavelength of 1550 nm, the fiber cutoff wavelength λc, the cable cutoff wavelength λcc, the difference (λc–λcc), the MAC value, and the bending loss at a wavelength of 1550 nm for the optical fiber 1B wound by ten turns with a bend diameter of 30 mm.

Fibers 1 to 15 each have characteristics conforming to ITU-T G.652. Fibers 4, 5, 13, and 14 are based on the first embodiment not employing the depressed portion 12. The others are based on the second embodiment employing the depressed portion 12. With the depressed portion 12, the bending loss can be made much smaller.

FIG. 17 is a table summarizing relevant factors of Fibers 16 to 24 according to other specific examples. The factors summarized in the table are as follows, in order from the top: the zero-dispersion wavelength $\lambda_0$, the MFD at a wavelength of 1310 nm, the fiber cutoff wavelength λc, the cable cutoff wavelength λcc, the difference (λc–μcc), the MAC value, and the bending loss at a wavelength of 1550 nm wound by ten turns with a bend diameter of 30 mm, the diameter of the cladding, the outer diameter of first resin layer, and the outer diameter of the second resin layer.

It is preferable that the optical fiber include cladding having an outside diameter of 124.3 μm to 125.7 μm. For example, the optical fiber may include a first resin layer having an outside diameter of 180 μm to 200 μm, and a second resin layer having an outside diameter of 235 μm to 255 μm. As another example, the optical fiber may include a first resin layer having an outside diameter of 150 μm to 175 μm, and a second resin layer having an outside diameter of 188 μm to 210 μm. Such optical fibers each include resin layers having smaller outside diameters than those of known optical fibers and are therefore advantageous in that a more number of optical fibers can be provided more densely in one cable.

What is claimed is:

1. An optical fiber comprising:
   a core having a diameter $2a$ of 9 μm to 14 μm; a maximum refractive index $n_1$; and
   a radial refractive-index profile expressed with an exponent α of 1.5 to 10;
   a cladding provided around the core and having a refractive index $n_0$ that is lower than the maximum refractive index $n_1$; and
   a depressed portion provided around the core and between the core and the cladding and having a refractive index $n_2$ that is lower than both the maximum refractive index $n_1$ and the refractive index $n_0$,
   wherein a relative refractive-index difference $\Delta_1$ at a center of the core that is expressed as $\Delta_1=100\times(n_1^2-n_0^2)/(2n_1^2)$ is 0.3% to 0.5%, and a relative refractive-index difference $\Delta_2$ of the depressed portion that is expressed as $\Delta_2=100\times(n_2^2-n_0^2)/(2n_2^2)$ is −0.1% to 0% and
   wherein the optical fiber has
   a zero-dispersion wavelength of 1300 nm or longer and 1324 nm or shorter,
   a cable cutoff wavelength λcc of 1260 nm or shorter, and
   a bending loss at a wavelength of 1550 nm of 0.25 dB or smaller in a case where the optical fiber is wound by ten turns with a bend diameter of 30 mm.

2. The optical fiber according to claim 1, wherein the depressed portion has an outside diameter $2b$, and a ratio (b/a) of the outside diameter $2b$ of the depressed portion to the diameter $2a$ of the core is 2.4 to 4.0.

3. The optical fiber according to claim 1, wherein the exponent α is 2.0 to 5.0.

4. The optical fiber according to claim 1, wherein the bending loss of the optical fiber at the wavelength of 1550 nm is 0.03 dB or smaller in the case where the optical fiber is wound by ten turns with the bend diameter of 30 mm.

5. The optical fiber according to claim 1, wherein the optical fiber has a fiber cutoff wavelength λc 50 nm or more and 100 nm less larger than the cable cutoff wavelength λcc.

6. The optical fiber according to claim 1, further comprising:
   a first resin layer provided around the cladding and made of ultraviolet-curable resin; and
   a second resin layer provided around the first resin layer and made of ultraviolet-curable resin,
   wherein the cladding has an outside diameter of 124.3 μm to 125.7 μm, and
   wherein the second resin layer has an outside diameter of 188 μm to 210 μm.

* * * * *